(12) United States Patent
Wise

(10) Patent No.: US 9,042,911 B1
(45) Date of Patent: May 26, 2015

(54) DYNAMICALLY RECONFIGURED GEO-FENCE BOUNDARIES

(71) Applicant: MTN Satellite Communications, Seattle, WA (US)

(72) Inventor: Robert M Wise, Issaquah, WA (US)

(73) Assignee: MTN Satellite Communications Inc., Seattle, WA (US)

( * ) Notice: Subject to any disclaimer, the term of this patent is extended or adjusted under 35 U.S.C. 154(b) by 0 days.

(21) Appl. No.: 14/309,891

(22) Filed: Jun. 20, 2014

(51) Int. Cl.
*H04W 24/00* (2009.01)
*H04W 4/02* (2009.01)
*H04W 8/08* (2009.01)

(52) U.S. Cl.
CPC .............. *H04W 4/021* (2013.01); *H04W 4/028* (2013.01); *H04W 8/08* (2013.01); *H04W 4/02* (2013.01)

(58) Field of Classification Search
CPC ...... H04W 16/28; H04W 16/30; H04W 16/32; H04W 64/00; H04W 4/021; H04W 4/028; H04W 4/02; H04W 24/00; H04W 24/06
USPC .............. 455/562.1, 456.1, 456.5, 456.6, 514
See application file for complete search history.

(56) References Cited

U.S. PATENT DOCUMENTS

| 6,356,242 | B1 * | 3/2002 | Ploussios ...................... 343/795 |
| 8,248,988 | B2 * | 8/2012 | Bolgiano et al. .............. 370/320 |
| 2008/0007471 | A1 * | 1/2008 | Goldberg et al. ............. 343/705 |
| 2010/0041407 | A1 * | 2/2010 | Caire et al. ..................... 455/446 |
| 2010/0120415 | A1 * | 5/2010 | Urquhart et al. .............. 455/424 |
| 2014/0210683 | A1 * | 7/2014 | Aryanfar et al. .............. 343/850 |
| 2014/0257058 | A1 * | 9/2014 | Clarysse et al. .............. 600/301 |

* cited by examiner

*Primary Examiner* — Khai M Nguyen
(74) *Attorney, Agent, or Firm* — FSP LLC

(57) ABSTRACT

An antenna pairing system includes a mobile communication platform (MCP) and a prediction system to determine geographic boundaries where particular pairs of antennas aboard the MCP and their respective data bearers should be activated or deactivated along a predicted course and heading for the MCP. The system manages network connectivity for the MCP in real-time and to alter antenna pairing in response to the determined geographical boundaries.

13 Claims, 13 Drawing Sheets

US 9,042,911 B1

DYNAMICALLY RECONFIGURED GEO-FENCE BOUNDARIES

CROSS-REFERENCE TO RELATED APPLICATIONS

Not Applicable.

BACKGROUND OF THE INVENTION

The infrastructure required to supply a high quality of continuous, two-way data communication to a mobile communication platform is expensive and complex. A variety of data bearers come into play at various points along a voyage. The various bearers have different capacities, costs per bit, QoS profiles, and geographic zones of coverage. Many variables are subject to optimization to approach any given performance or cost metrics. In the normal course of operation of an MCP, data may be collected at many points along the technical chain on actual performance as a function of time, space, user load, environmental conditions, and other inputs for later analysis and construction of statistical models.

In the course of the voyage of an MCP, depending on given factors, it is advantageous to minimize the consumption of scarce/expensive data bearers and at times to maximize total bandwidth. Another metric subject to goal setting is QoS, which may be expressed as continuity of connectivity, delay, network jitter, packet loss, speed, or any combination.

BRIEF SUMMARY OF THE INVENTION

Not Applicable.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION OF THE INVENTION

Glossary

Figure 1:
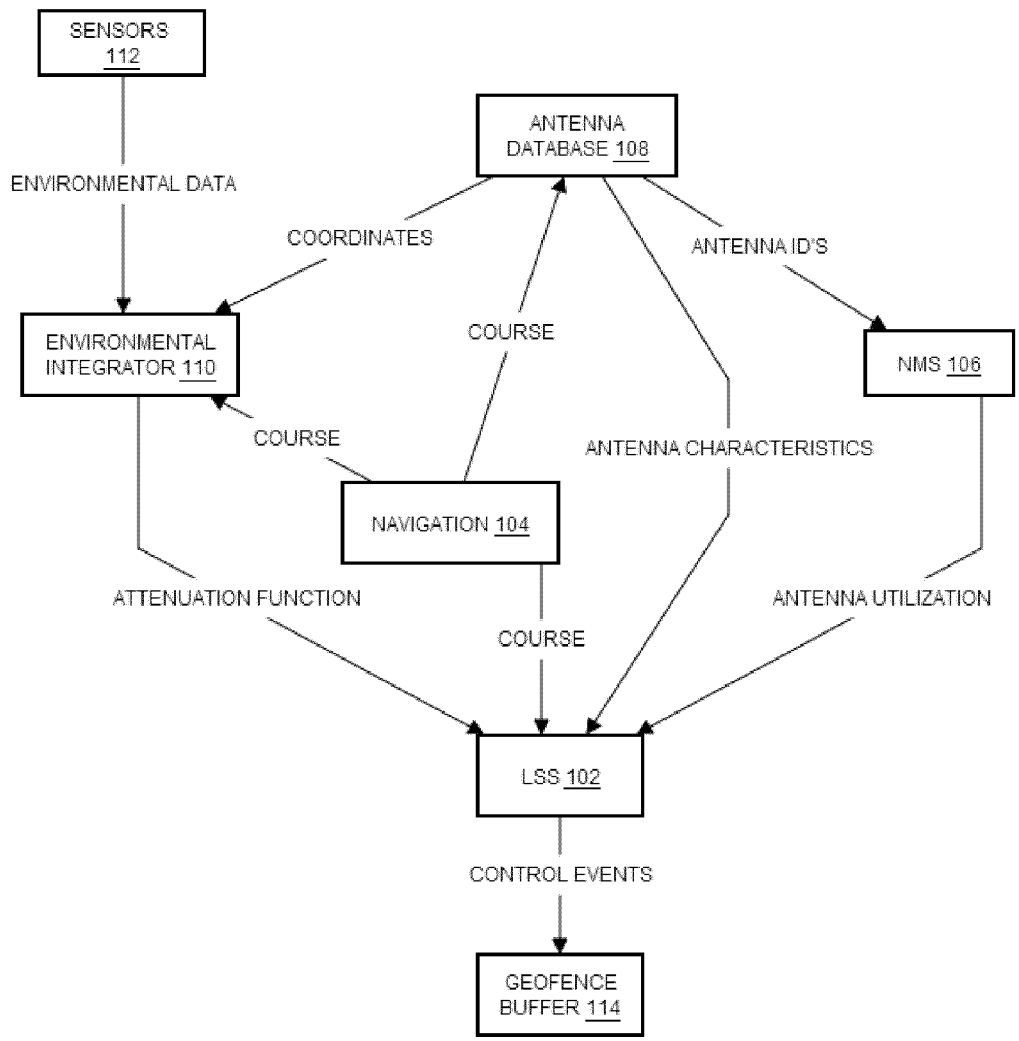
FIG. 1 is a system diagram of an embodiment of a dynamic geofence configuration process.

"(radio wave) RF" in this context refers to (radio frequency) a rate of oscillation in the range of about 3 kHz to 300 GHz, which corresponds to the frequency of electromagnetic radio waves, and the alternating currents which carry radio signals. RF usually refers to electrical rather than mechanical oscillations, although mechanical RF systems do exist. (Radio) can refer to anything related to radio signals, which are invisible electromagnetic waves created by applying a pulsing electric current to an antenna.

"Antenna" in this context refers to a physical device that facilitates the transmission and reception of radio waves. Antennas are used in systems such as radio and television broadcasting, point-to-point radio communication, wireless LAN, mobile phones, radar, and spacecraft communication. Antennas come in a variety of shapes and sizes.

"database" in this context refers to an organized collection of data (states of matter representing values, symbols, or control signals to device logic), structured typically into tables that comprise 'rows' and 'columns', although this structure is not implemented in every case. One column of a table is often designated a 'key' for purposes of creating indexes to rapidly search the database.

"LSS" in this context refers to Local Service Selector, a machine and logic located on individual vessels/vehicles (MCPs), and which performs processing local to the MCP, usually in cooperation with an external data network and shoreside (non-mobile) machine systems (e.g., an NMS)

"MCP" in this context refers to MCP refers to Mobile Communications Platform, moving machines having local (on board) logic. The term MCP includes ships, land vehicles (trucks, trains, cars . . . ), and aircraft.

"Modem" in this context refers to (modulator-demodulator) a device that modulates a carrier signal to encode digital information, and also demodulates such a carrier signal to decode the transmitted information.

"NMS" in this context refers to NMS refers to Network Management System, one or more machines that manage data traffic, quality, and resource requests for a machine network "processor" in this context refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine.

"Sensor" in this context refers to a device or composition of matter that responds to a physical stimulus (as heat, light, sound, pressure, magnetism, or a particular motion) and transmits a resulting impulse (as for measurement or operating a control).

"transducer" in this context refers to a device that converts a signal in one form of energy to another form of energy.[1] Energy types include (but are not limited to) electrical, mechanical, electromagnetic (including light), chemical, acoustic and thermal energy. While the term transducer commonly implies the use of a sensor/detector, any device which converts energy can be considered a transducer. Transducers are widely used in measuring instruments.

"WML" in this context refers to Wireless Markup Language. An industry-standard markup language for creating special, small web sites optimized for phones. WML was a core feature of the WAP 1.x standard. WML has generally been phased out in favor of the newer xHTML standard, part of WAP 2.0. Most phones support both WAP 1.x (WML and WAP 2.0 (XHTML). Older phones may only support WAP 1.x (WML) sites.

DESCRIPTION

Embodiments of a goal-seeking, self-correcting/learning system and process are described for mapping on/off events to antennas and data bearers on an MCP in relation to non-MCP (shore based or orbiting or otherwise mobile) antennas and data bearers and mapped to position and orientation of the MCP along a known, set, or predicted course.

Before a voyage takes place, the system computes where particular pairs of antennas and their respective data bearers should be activated or deactivated at various boundaries along any predicted course and heading to meet set objectives for MCP network performance. The actual voyage takes place and network connectivity is managed in real-time according to the predetermined geographical fences. During the voyage data on network performance, actual course, environment, etc. are logged. Post voyage, a feedback process is applied to update the predictive model and parameters of the model to minimize discrepancies between logged and predicted performance.

FIG. 1 illustrates an exemplary use of the system. A voyage of an MCP is planned, so there is a known course. The course brings the MCP within range of a variety of antennas connected to various data bearers not on the MCP. A database supplies characteristics of each non-MCP antenna and of MCP antennas capable of pairing with same. Antenna characteristics include frequency band, polarization, gain as a function of direction, beam tilt up or down, angular beam width horizontally and vertically, antenna altitude, and so on. An NMS supplies known, forecasted, or typical available capacity to/from each non-MCP antenna. In one embodiment, this includes a measure of variability. Sensors, both local to the MCP and remote, supply environmental data (humidity, precipitation, sea surface roughness, wave height, ionospheric conditions, locations of obstructions, etc.) to an environmental integrator which predicts radio wave attenuation between any pair of antennas as a function of environmental inputs, antenna characteristics, and relative antenna positions and orientations. From the inputs of attenuation function, course, antenna characteristics, antenna utilization, and set objectives for network performance, the LSS performs a goal-seeking search of the parameter space whose output is a set of control events (to MCP modems and antenna systems) mapped to boundary curves in space, the crossing of which by the course of the MCP would constitute a trigger.

Figure 4:
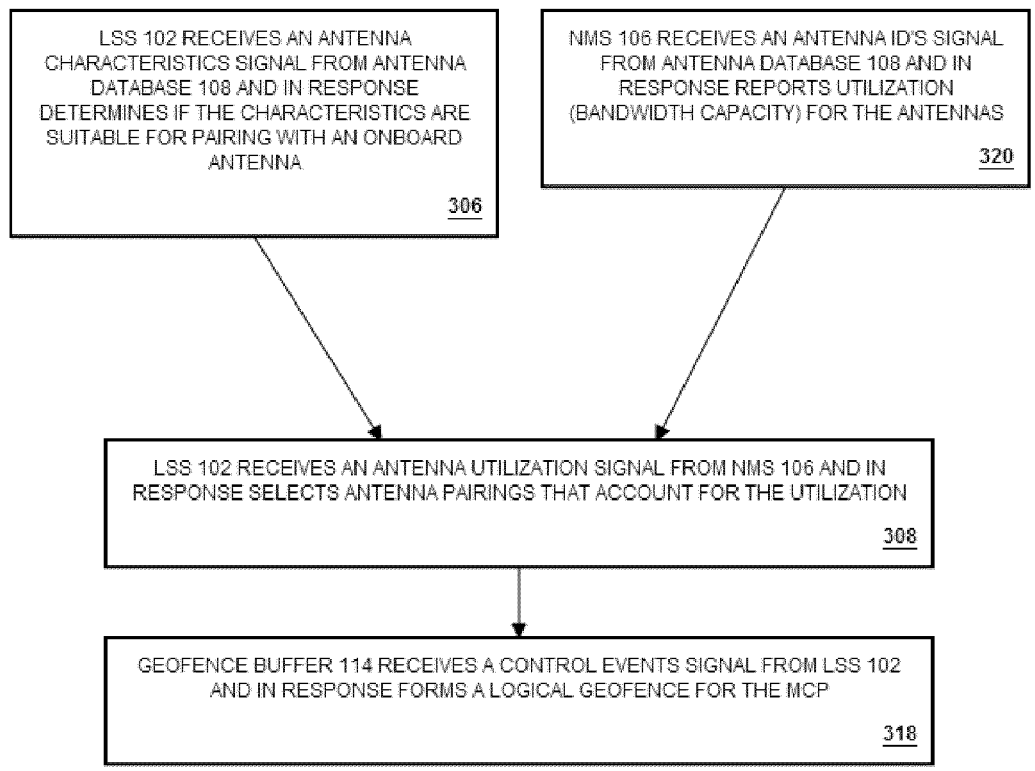
FIG. 4 is a flow chart of an embodiment of a dynamic geofence configuration process process.

FIG. 4 illustrates an aspect of the system in which it logs the observed performance of the network, each component of the network, the associated environmental data, and the measured attenuation along each radio signal pathway, as functions of the actual position vs time of the MCP as it proceeds through a voyage.

Figure 7:
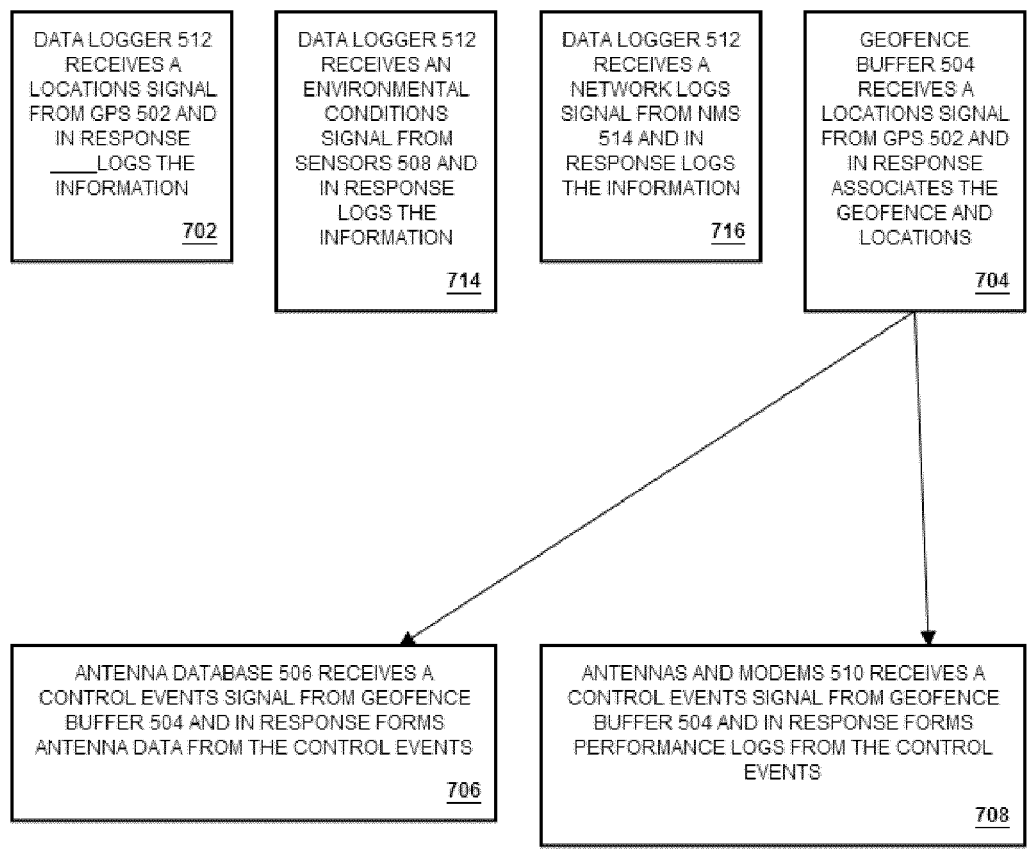
FIG. 7 is a flow chart of an embodiment of a geofence measurement process process.

FIG. 7 depicts a feedback/learning process aspect of the invention. Logged data on conditions, inputs, and performance are compared to performance as predicted from the observed inputs by the model in the LSS used to establish the original geofenced antenna and modem control boundaries. The comparison takes place in a discrepancy analyzer which partitions detected deviations of actual from forecast into corrections which are fed back into the performance prediction process, the antenna database, and the environmental integrator.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

DRAWINGS

Figure 2:
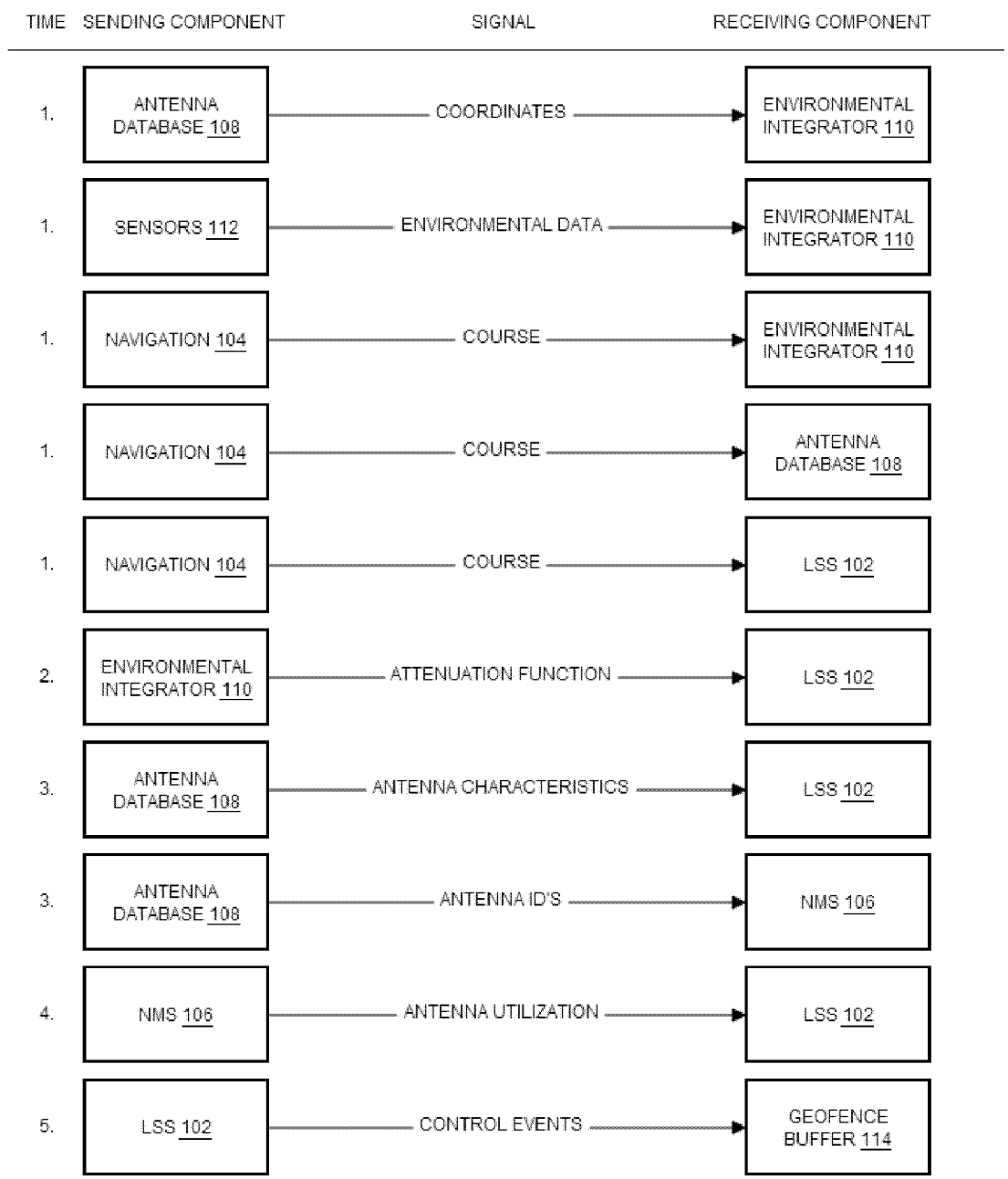
FIG. 2 is an action flow diagram of an embodiment of a dynamic geofence configuration process process.
Figure 3:
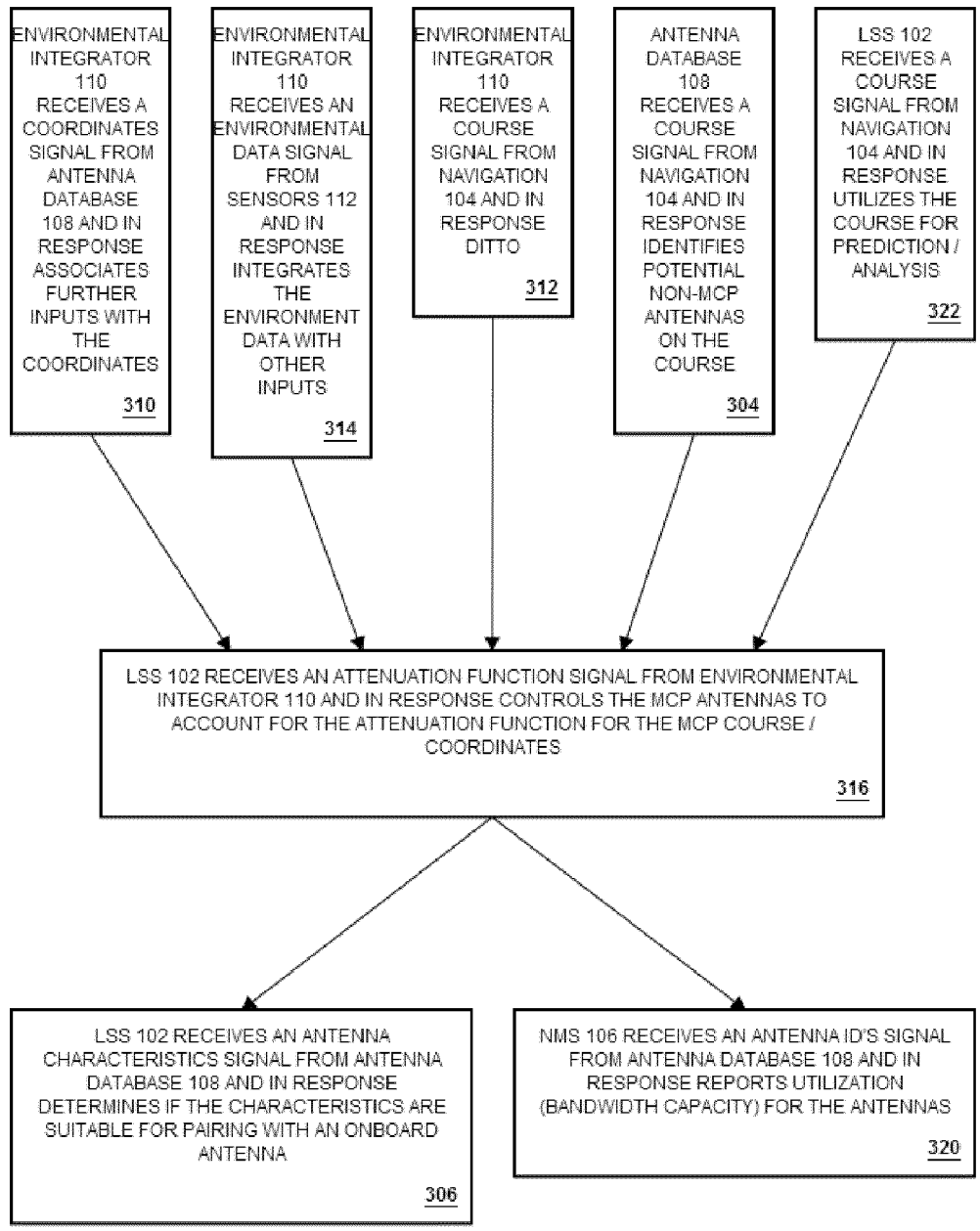
FIG. 3 is a flow chart of an embodiment of a dynamic geofence configuration process process.

FIG. 1 is a system diagram of an embodiment of a dynamic geofence configuration process. FIG. 2 is an action flow diagram of an embodiment of a dynamic geofence configuration process process. FIG. 3-4 is a flow chart of an embodiment of a dynamic geofence configuration process process. The system comprises LSS 102, Navigation 104, NMS 106, antenna database 108, environmental integrator 110, sensors 112, and geofence buffer 114.

An environmental integrator 110 receives coordinates, environmental data, and course information for the MCP (310, 312, 314). It transforms these signals into an integrated model of the MCP environment at a point along the course. The antenna database 108 receives the MCP course in response identifies potential non-MCP antennas on the course that might be suitable for pairing with MCP antennae (304). The LSS 102 receives the course information (322), attenuation function (316), and antenna characteristics and in response determines which non-MCP antennae upcoming on the course are suitable for pairing with an onboard antenna (306).

The NMS 106 receives an antenna id's signal from the antenna database 108 and in response reports utilization (bandwidth capacity) for the antennas (320). The LSS 102 receives an antenna utilization signal from the NMS 106 and in response selects antenna pairings that account for the utilization (308). A geofence buffer 114 receives a signal from LSS 102 and in response forms a logical geofence for the MCP (318).

Figure 5:
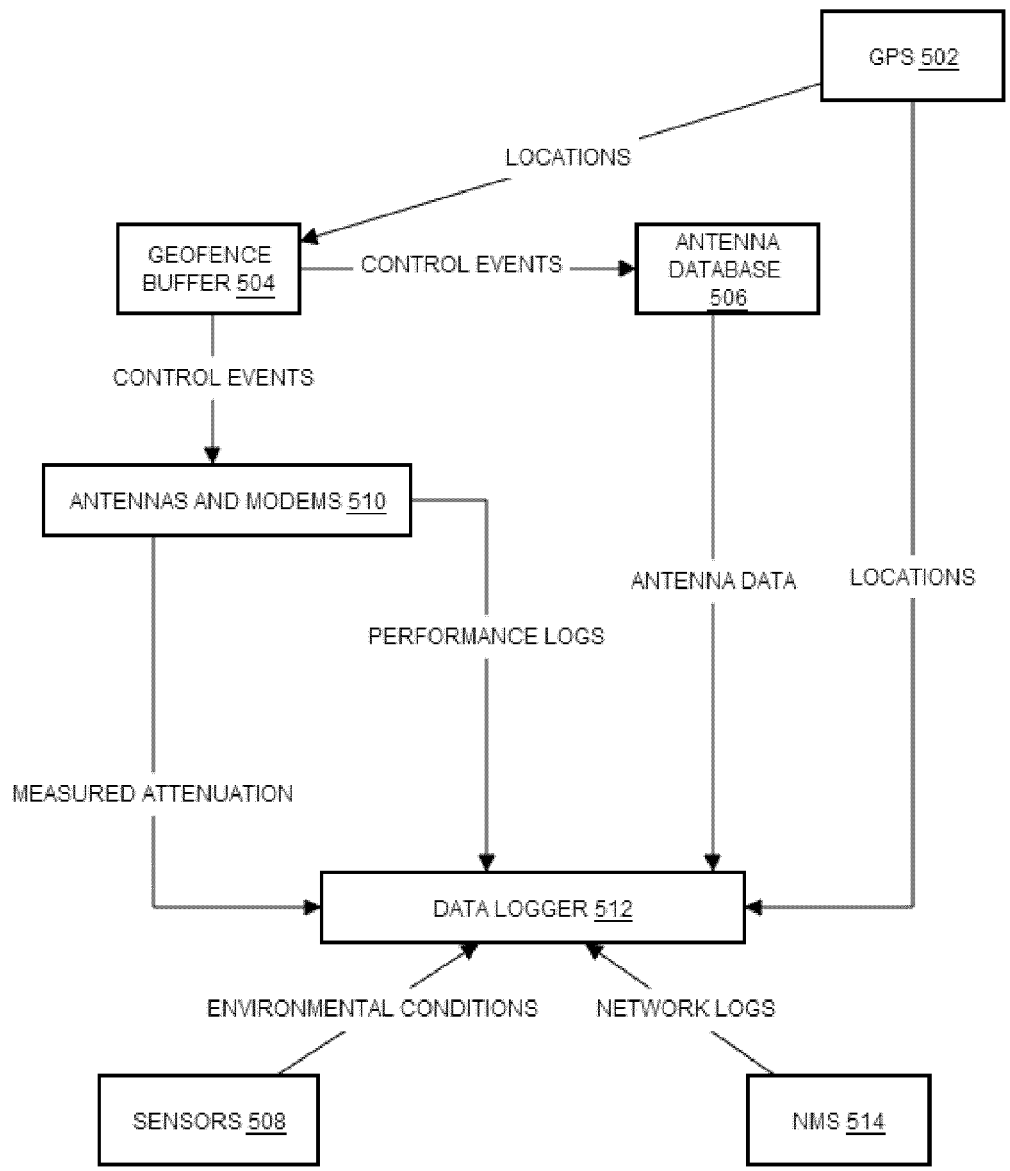
FIG. 5 is a system diagram of an embodiment of a geofence measurement process.
Figure 6:
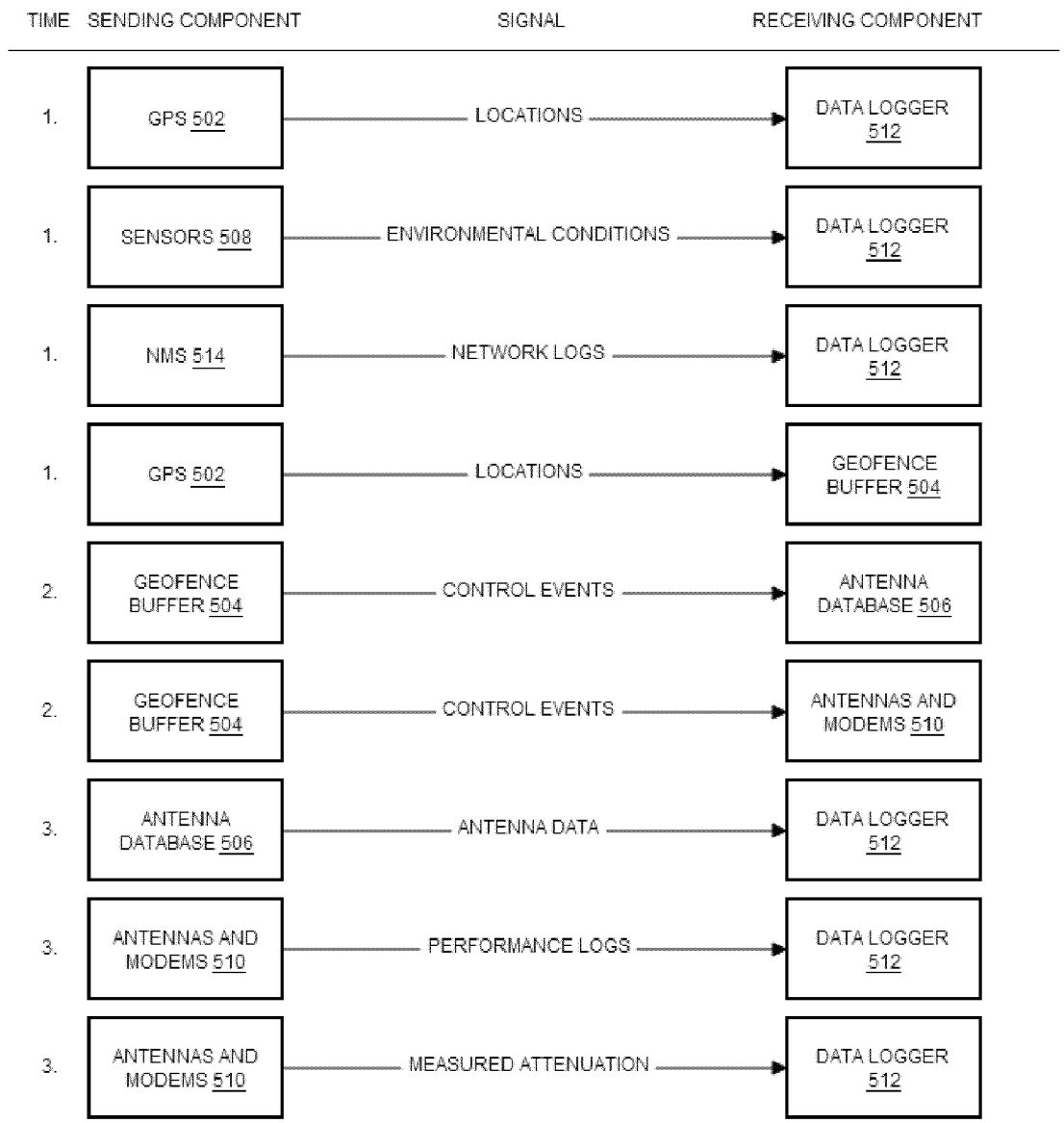
FIG. 6 is an action flow diagram of an embodiment of a geofence measurement process process.
Figure 8:
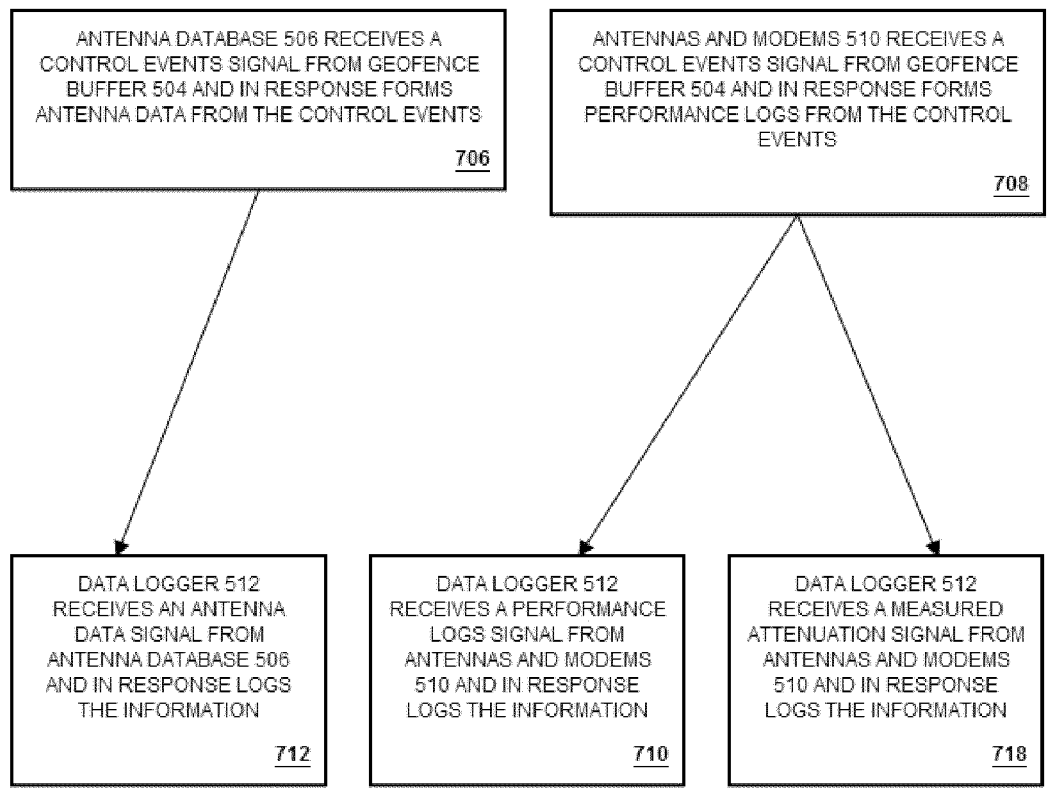
FIG. 8 is a flow chart of an embodiment of a geofence measurement process process.

FIG. 5 is a diagram of an embodiment of a geofence measurement system. FIG. 6 is an action flow diagram of an embodiment of a geofence measurement process. FIG. 7-8 is a flow chart of an embodiment of a geofence measurement process. The system comprises GPS 502, geofence buffer 504, antenna database 506, sensors 508, antennas and modems 510, data logger 512, and NMS 514. The data logger 512 receives locations, environmental conditions, and network logs (702, 704, 712, 716). The geofence buffer 504 receives locations and associates the locations with a geofence (704). The antenna database 506 receives the control events and in response forms antenna data (706). The antennas and modems 510 receive control events and in response form performance logs (708). The data logger 512 receives the antenna data (712), performance logs (710), and measured attenuation (718) and in response logs this information along with the locations, environmental conditions, and network logs.

Figure 9:
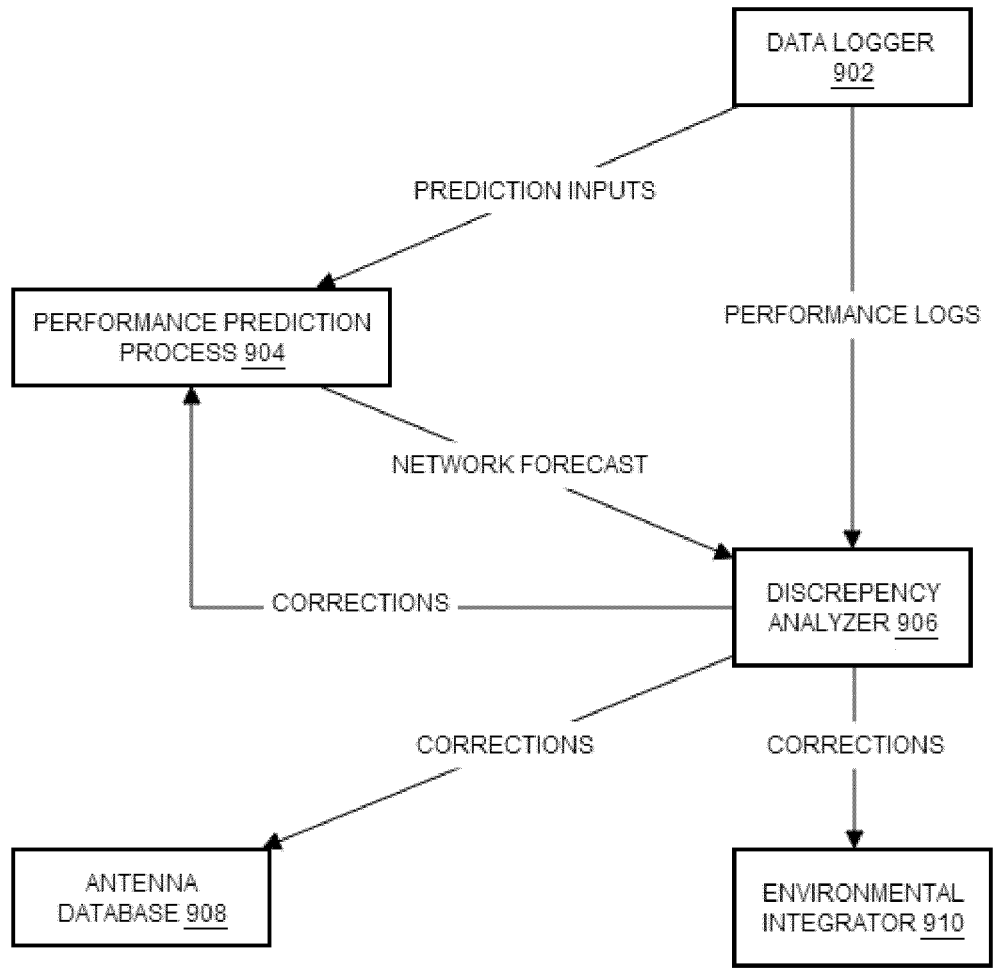
FIG. 9 is a diagram of an embodiment of a geofence update system.
Figure 10:
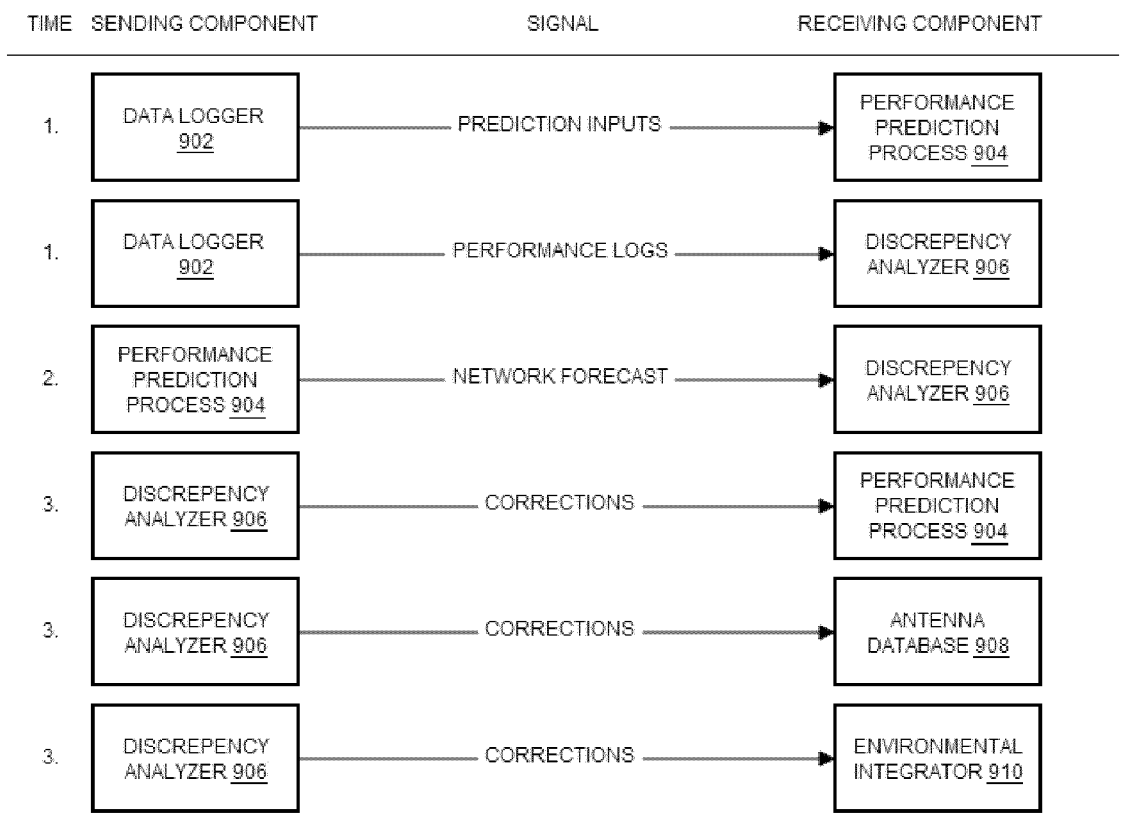
FIG. 10 is an action flow diagram of an embodiment of a geofence update process.
Figure 11:
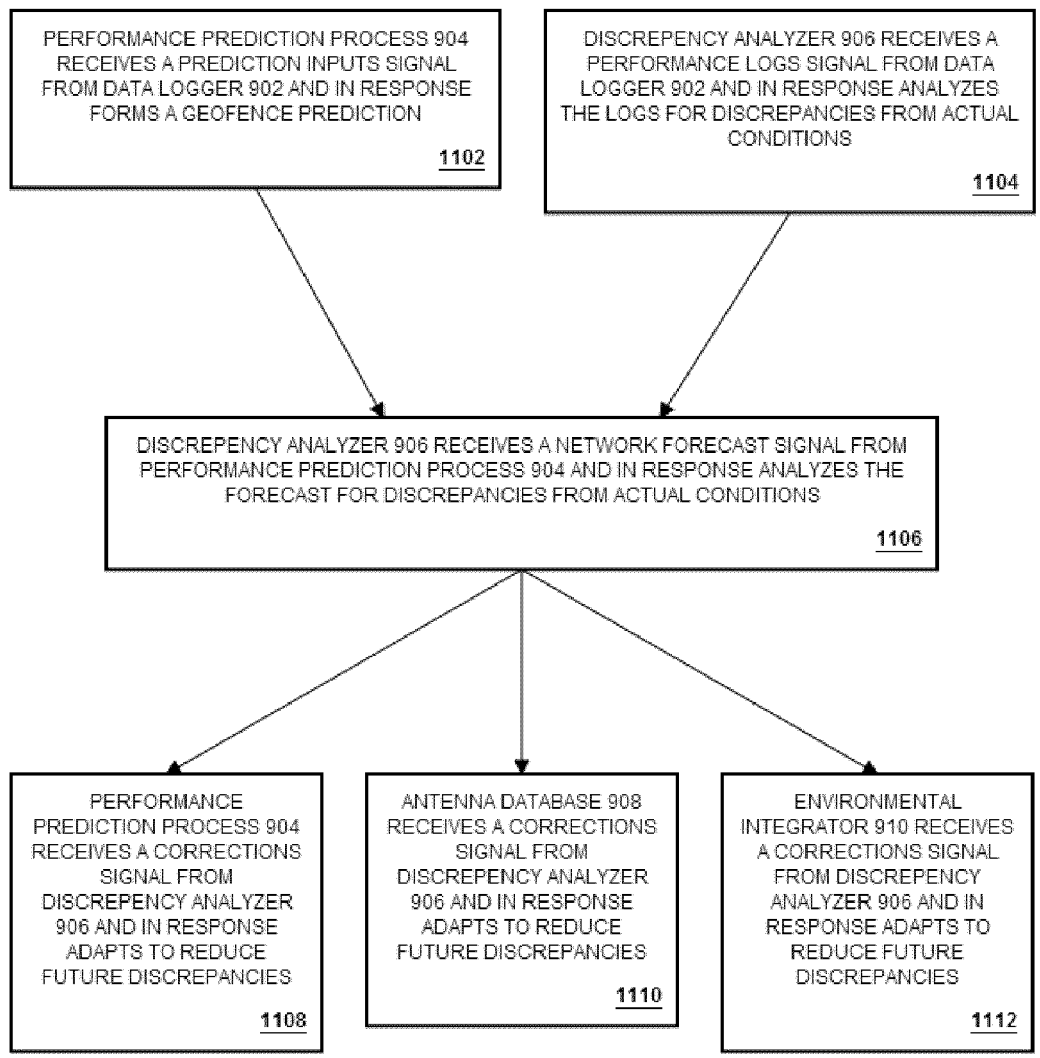
FIG. 11 is a flow chart of an embodiment of a geofence update process.

FIG. 9 is a diagram of an embodiment of a geofence update system. FIG. 10 is an action flow diagram of an embodiment of a geofence update process. FIG. 11 is a flow chart of an embodiment of a geofence update process. The system comprises data logger 902, performance prediction process 904, discrepency analyzer 906, antenna database 908, and environmental integrator 910. The performance prediction process 904 receives a prediction inputs signal from the data logger 902 and in response forms a geofence prediction (1102). The discrepency analyzer 906 receives a performance logs signal from the data logger 902 and in response analyzes the logs for discrepancies from actual conditions (1104). The discrepency analyzer 906 receives a network forecast signal from the performance prediction process 904 and in response analyzes the forecast for discrepancies from actual conditions (1106). The performance prediction process 904 receives a corrections signal from the discrepency analyzer 906 and in response adapts to reduce future discrepancies (1108). The antenna database 908 receives a corrections signal from discrepency analyzer 906 and in response adapts to reduce future discrepancies (1110). The environmental integrator 910 receives a corrections signal from the discrepency analyzer 906 and in response adapts to reduce future discrepancies (1112).

Figure 12:
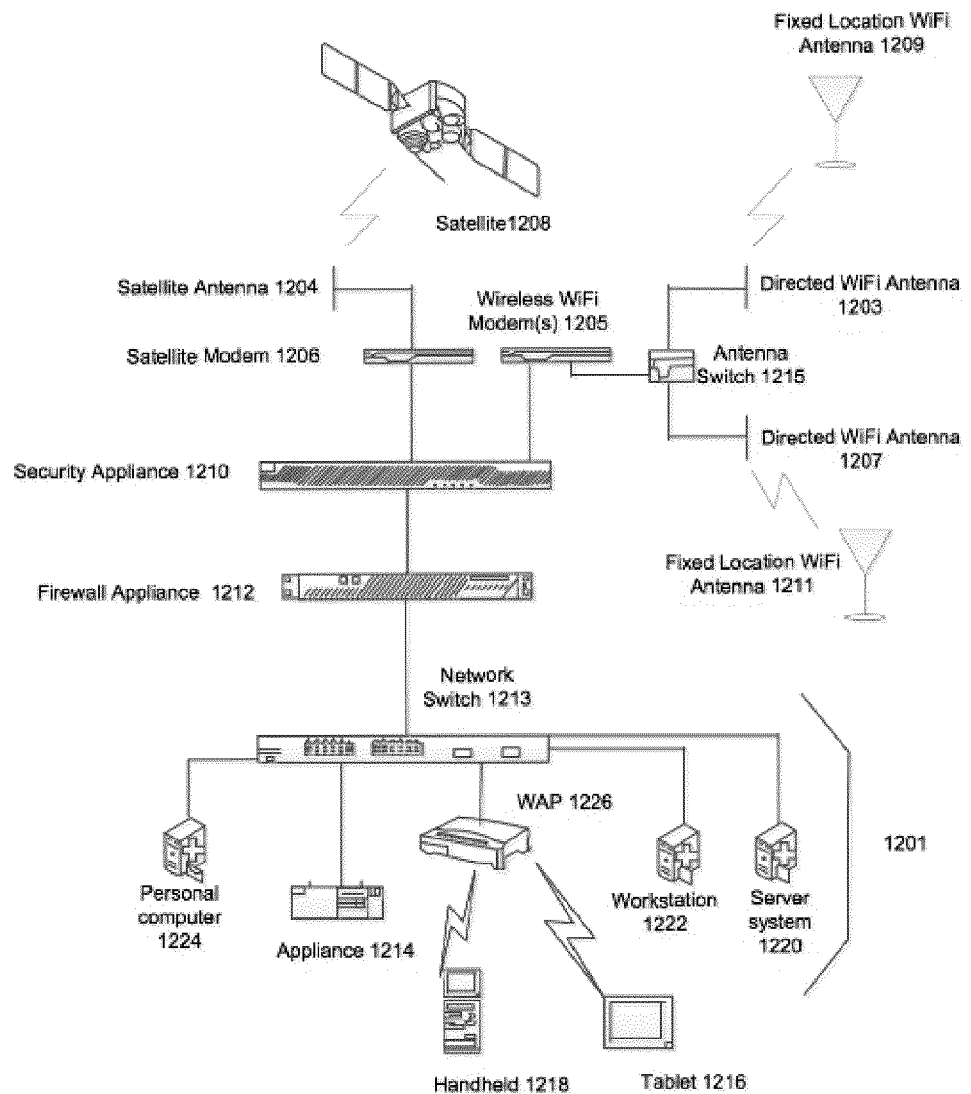
FIG. 12 is an embodiment of a machine network.

FIG. 12 illustrates an embodiment of a machine network that may be utilized to implement a geofencing system embodiment. Communication is carried out between devices of a local area network (LAN) 1201 and a wide area network (WAN) (e.g., the Internet) via a satellite antenna 1204 and satellite 1208. The LAN 1201 includes server systems 1220, personal computers 1224, appliances 1214, tablets 1216, handheld (mobile) devices 1218, and workstations 1222. A WAP 1226 provides wireless access to the LAN 1201. Of course, a typical LAN includes other devices as well, such as printers, faxes, scanners, etc. The networks are bridged via a system of devices including (in this example) a satellite modem 1206, a security appliance 1210, a firewall appliance 1212, and a network switch 1218. The security appliance 1210 (e.g., Cisco 5510) provides, for example, firewall and VPN (virtual private network) concentration, intrusion detection, and intrusion prevention. The firewall appliance 1212 (e.g., Barracuda) provides, for example, anti-virus and anti-fishing protection for the LAN 1201, and web, email, and file content filtering. Communication traffic is switched between the LAN 1201 and the WAN by a network switch 1218. The WAN may also be accessed in some circumstances via WiFi (e.g., wireless proximity to one or more fixed location WiFi antennas 1209 and 1211). A WiFi 'modem' 1205 may provide signals to an antenna switch 1215, which in turn provides the signals to one or more directed WiFi antennas 1203, 1207. The signals are communicated to and from the antennas 1203, 1207 using WiFi to one or more fixed location WiFi antennas 1209 and 1211.

Figure 13:
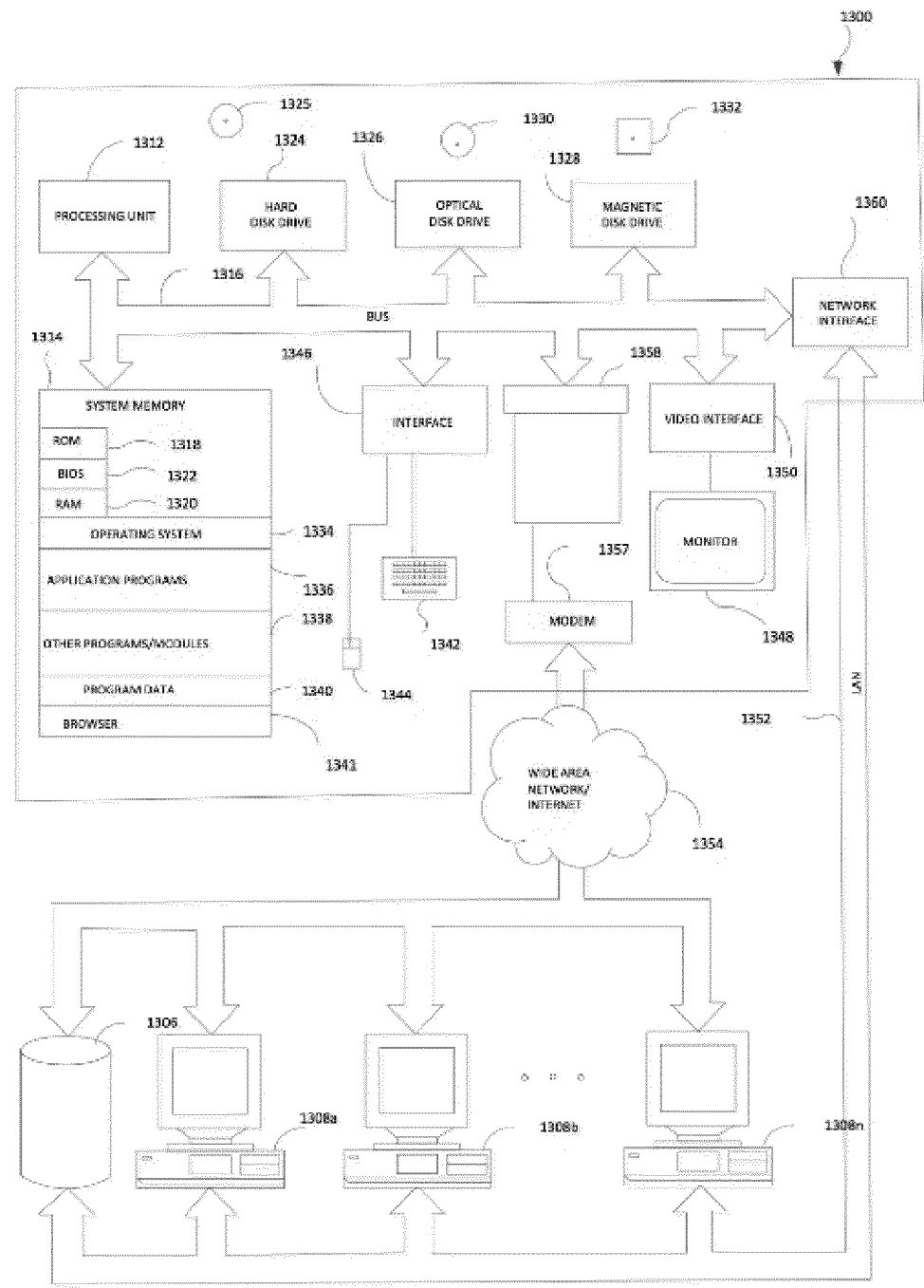
FIG. 13 an is an embodiment of a computer system machine and a machine communication network.

FIG. 13 illustrates an embodiment of a computer system machine and a machine communication network. The computer system 1300 and/or other system devices (e.g., computer systems 1308*a-n*) may implement an embodiment of one or more system components described herein. A particular computer system 1300 of the machine network may include one or more processing units 1312, a system memory 1314 and a system bus 1316 that couples various system components including the system memory 1314 to the processing units 1312. The processing units 1312 may be any logic processing unit, such as one or more central processing units (CPUs), digital signal processors (DSPs, application-specific integrated circuits (ASICs), field programmable gate arrays (FPGAs), etc. The system bus 1316 can employ any known bus structures or architectures, including a memory bus with memory controller, a peripheral bus, and a local bus. The system memory 1314 includes read-only memory (ROM) 1318 and random access memory (RAM) 1320. A basic input/output system (BIOS) 1322, which can form part of the ROM 1318, contains basic routines that help transfer information between elements within the computer system 1300, such as during start-up.

The computer system 1300 may also include a plurality of interfaces such as network interface 1360, interface 1358 supporting modem 1357 or any other wireless/wired interfaces.

The computer system 1300 may include a hard disk drive 1324 for reading from and writing to a hard disk 1325, an optical disk drive 1326 for reading from and writing to removable optical disks 1330, and/or a magnetic disk drive 1328 for reading from and writing to magnetic disks 1332. The optical disk 1330 can be a CD-ROM, while the magnetic disk 1332 can be a magnetic floppy disk or diskette. The hard disk drive 1324, optical disk drive 1326 and magnetic disk drive 1328 may communicate with the processing unit 1312 via the system bus 1316. The hard disk drive 1324, optical disk drive 1326 and magnetic disk drive 1328 may include interfaces or controllers (not shown) coupled between such drives and the system bus 1316, as is known by those skilled in the relevant art. The drives 1324, 1326 and 1328, and their associated computer-readable storage media 1325, 1330, 1332, may provide non-volatile and non-transitory storage of computer readable instructions, data structures, program modules and other data for the computer system 1300. Although the depicted computer system 1300 is illustrated employing a hard disk 1324, optical disk 1326 and magnetic disk 1328, those skilled in the relevant art will appreciate that other types of computer-readable storage media that can store data accessible by a computer may be employed, such as magnetic cassettes, flash memory, digital video disks (DVD), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 1312.

Program modules can be stored in the system memory 1314, such as an operating system 1334, one or more application programs 1336, other programs or modules 1338 and program data 1340. Application programs 1336 may include instructions that cause the processor(s) 1312 to automatically provide dynamic selection of data and telecommunication service providers before or during communications between various devices such as, for example, a mobile device and a landline telephone. Other program modules 1338 may include instructions for handling security such as password or other access protection and communications encryption. The system memory 1314 may also include communications programs, for example, a Web client or browser 1341 for permitting the computer system 1300 to access and exchange data with sources such as Web sites of the Internet, corporate intranets, extranets, or other networks and devices as described herein, as well as other server applications on server computing systems. The browser 1341 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft.

Although illustrated as being stored in the system memory 1314, the operating system 1334, application programs 1336, other programs/modules 1338, program data 1340 and browser 1341 can be stored on the hard disk 1325 of the hard disk drive 1324, the optical disk 1330 of the optical disk drive 1326 and/or the magnetic disk 1332 of the magnetic disk drive 1328.

An operator can enter commands and information into the computer system 1300 through input devices such as a touch screen or keyboard 1342 and/or a pointing device such as a mouse 1344, and/or via a graphical user interface. Other input devices can include a microphone, joystick, game pad, tablet, scanner, etc. These and other input devices are connected to one or more of the processing units 1312 through an interface 1346 such as a serial port interface that couples to the system bus 1316, although other interfaces such as a parallel port, a game port or a wireless interface or a universal serial bus (USB) can be used. A monitor 1348 or other display device is coupled to the system bus 1316 via a video interface 1350, such as a video adapter. The computer system 1300 can include other output devices, such as speakers, printers, etc.

The computer system 1300 can operate in a networked environment using logical connections to one or more remote computers and/or devices. For example, the computer system 1300 can operate in a networked environment using logical connections to one or more mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks. Communication may take place between the computer system 1300 and external devices via a WAN 1354 or LAN 1352. External devices may include other computer system 1308a-n (collectively, 1308) and external storage devices 1306.

What is claimed is:

1. An antenna pairing system, comprising:
    a prediction system to determine geographic boundaries where particular antennas aboard a mobile communication platform (MCP) and their respective data bearers should be activated or deactivated along a predicted course and heading for the MCP;
    a system to manage network connectivity for the MCP in real-time and to alter antenna pairings of the antennas aboard the MCP (MCP antennas) with antennas not aboard the MCP (non-MCP antennas) in response to the determined geographical boundaries; and
    a database comprising characteristics of each non-MCP antenna and of MCP antennas capable of pairing with each non-MCP antenna.

2. The system of claim 1, wherein the characteristics include frequency band, polarization, gain as a function of direction, beam tilt up or down, angular beam width horizontally and vertically, and antenna altitude.

3. The system of claim 1, further comprising a network management system providing known, forecasted, or typical available bandwidth capacity to or from each non-MCP antenna.

4. The system of claim 3, further comprising:
    a network management system providing a measure of variability.

5. The system of claim 1, further comprising:
    sensors, both local to the MCP and remote, supplying environmental data to an environmental integrator which predicts radio wave attenuation between any pair of antennas as a function of environmental inputs, antenna characteristics, and relative antenna positions and orientations.

6. The system of claim 5, further configured to process input signals of attenuation function, course, antenna characteristics, and antenna utilization, and to set objectives for network performance to perform a goal-seeking search of a parameter space and to output a set of control events to MCP modems and antenna systems mapped to boundary curves in space, the crossing of which by the course of the MCP constituting a trigger.

7. The system of claim 5, further configured to implement a feedback/learning process in which logged data on conditions, inputs, and performance are compared to performance as predicted from observed inputs by a model used to establish original geofenced antenna and modem control boundaries.

8. The system of claim 7, further comprising:
    a discrepancy analyzer which partitions detected deviations of actual from forecast into corrections which are fed back into the feedback/learning process, an antenna database, and an environmental integrator.

9. The system of claim 1, further comprising:
    the prediction system configured to determine the geographic boundaries to meet set objectives for MCP network performance.

10. The system of claim 1, further configured to log data on network performance, actual MCP course, and environment during motion of the MCP along the course.

11. The system of claim 1, further configured to apply a feedback process post voyage of the MCP to update a predictive model and parameters of the model to minimize discrepancies between logged and predicted MCP network performance.

12. An antenna pairing system, comprising:
    a prediction system to determine geographic boundaries where particular antennas aboard a mobile communication platform (MCP) and their respective data bearers should be activated or deactivated along a predicted course and heading for the MCP;
    a system to manage network connectivity for the MCP in real-time and to alter antenna pairings of the antennas aboard the MCP (MCP antennas) with antennas not aboard the MCP (non-MCP antennas) in response to the determined geographical boundaries; and
    the prediction system configured to determine the geographic boundaries to meet set objectives for MCP network performance.

13. The antenna pairing system of claim 12, further comprising a network management system providing known, forecasted, or typical available bandwidth capacity to or from each non-MCP antenna.

* * * * *